US006617804B2

(12) United States Patent
Machida

(10) Patent No.: US 6,617,804 B2
(45) Date of Patent: Sep. 9, 2003

(54) GAS FILLED SWITCHING ELECTRIC DISCHARGE TUBE

(75) Inventor: Kazuhiko Machida, Nagano (JP)

(73) Assignee: Shinko Electric Industries Co., LTD, Nagano (JP)

( * ) Notice: Subject to any disclaimer, the term of this patent is extended or adjusted under 35 U.S.C. 154(b) by 0 days.

(21) Appl. No.: 10/083,458

(22) Filed: Feb. 26, 2002

(65) Prior Publication Data

US 2002/0171362 A1 Nov. 21, 2002

(30) Foreign Application Priority Data

Mar. 2, 2001 (JP) ....................................... 2001-058864

(51) Int. Cl.[7] .......................... H05B 41/16; H01J 11/00; H02H 1/00

(52) U.S. Cl. ................... 315/209 M; 313/567; 361/120

(58) Field of Search ....................... 315/111.01, 209 M, 315/349; 313/567, 571, 574, 576; 361/120

(56) References Cited

U.S. PATENT DOCUMENTS 5,517,081 A * 5/1996 Mitani et al. ............... 313/589
5,892,648 A * 4/1999 Bobert et al. ............... 361/120
6,194,820 B1 * 2/2001 Machida ................ 313/231.11
6,362,945 B1 * 3/2002 Bobert et al. ............... 361/120

* cited by examiner

*Primary Examiner*—Don Wong
*Assistant Examiner*—Minh D A
(74) *Attorney, Agent, or Firm*—Paul & Paul

(57) ABSTRACT

To extend the life of electric discharge and enhance the characteristic of electric discharge in the life test in a gas filled switching electric discharge tube. A gas filled switching electric discharge tube comprises: a cylindrical body (1) made of insulating material; two electrodes (2, 3) for airtightly closing both ends of the cylindrical body; an electric discharge gap, an airtightly closed space formed in the cylindrical body including the electric discharge gap being filled with gas; metalized faces formed on both end faces of the electrodes of the cylindrical body; first trigger wires (10*a*, 10*b*) formed on an inner wall face of the cylindrical body, connected with the metalized faces; and second trigger wires (10*c*) formed on the inner wall face of the cylindrical body, not connected with the metalized faces, wherein a number of the second trigger wires is larger than a number of the first trigger wires, an interval (t) of the electric discharge gap is made to be larger than a distance (d) from the second trigger wires to the electrode faces, and a plurality of recess portions (23) are formed on the electrode faces.

18 Claims, 11 Drawing Sheets

COMPARATIVE EXAMPLE (COMPARATIVE EXAMPLE)

GAS FILLED SWITCHING ELECTRIC DISCHARGE TUBE

BACKGROUND OF THE INVENTION

1. Field of the Invention

The present invention relates to a gas filled switching electric discharge tube. More particularly, the present invention relates to the structure of a gas filled switching electric discharge tube in which the voltage characteristic at the time of electric discharge is improved.

2. Related Art

The gas filled switching electric discharge tube includes: a cylindrical body made of an insulating material such as a ceramic; and a first and a second electrode for airtightly closing both ends of the cylindrical body, wherein an electric discharge gap is formed between the first electrode face of the first electrode and the second electrode face of the second electrode, and gas is filed into an airtightly closed space which is formed in the cylindrical body including the electric discharge gap. Due to the above structure, electric discharge is generated between the first electrode face and the second electrode face.

In the case where switching is conducted in the thus composed conventional switching electric discharge tube after it has been left in a completely dark place, the electric discharge voltage (FVs) of the first discharge is necessarily higher than electric discharge voltage (Vs) of the second discharge and following discharges. The reason why is that, as the switching electric discharge tube has been left in a dark place, it is impossible for photo-electrons, which always excite the filled gas in a bright state, to provide an excitation effect (photo-electron effect).

Conventionally, the life of electric discharge of the electric discharge tube has been extended and an increase of the FVs characteristic, in a life test, has been prevented by arranging carbon trigger wires on an inner wall face of the cylindrical body made of ceramic and devising various methods of arrangement.

For example, in order to improve the voltage characteristic of this type switching electric discharge tube in the case of discharg, the following arrangements have been proposed. Metalized faces are formed on both end faces, which come into contact with the electrodes, of the cylindrical body made of ceramic, and trigger wires are provided which come into contact with the metalized faces and extend on an inner wall face of the cylindrical body or, alternatively, trigger wires are provided which do not come into contact with the metalized faces but extend on the inner wall face of the cylindrical body. Referring to FIGS. 11 and 12, the arrangement of these carbon trigger wires will be explained below.

FIGS. 11 and 12 are views of the development of an inner wall face of the cylindrical body made of ceramic. In FIG. 11, the trigger wires 10*a*, 10*b* are extended from the metalized faces in the axial direction of the cylindrical body and arranged at regular intervals of 90°. In this case, the trigger wires are arranged at regular intervals of 90° on one metalized face 12 side and also arranged on the other metalized face 14 side alternately. The central trigger wires 10*c* are respectively arranged in the axial direction at regular intervals of 90° at the intermediate positions between the trigger wires 10*a* 10*b* which extend from the metalized faces.

In FIG. 12, the trigger wires 10*a*, 10*b*, the number of each of which is two, extending from the metalized faces in the axial direction are arranged close to each other. Other structural arrangements are the same as those of the case shown in FIG. 11.

In order to extend the life of electric discharge, it is necessary to reduce the number of the trigger wires coming into contact with the metalized faces. However, when the number of the trigger wires is reduced, there is caused an undesirable problem whereby FVs is raised. Further, when only the carbon trigger wire arrangements are devised, the effects of extending the life of electric discharge and preventing an increase of the FVs characteristic, in a life test, which must be compatible with each other, are limited.

In view of the limitation on compatibility of extending the life of electric discharge with preventing an increase in the FVs characteristic in the life test only when the carbon trigger wires are formed in the cylindrical body or only when the carbon trigger arrangements are devised, this invention has been accomplished.

SUMMARY OF THE INVENTION

Accordingly, it is an object of the present invention to provide a gas filled switching electric discharge tube capable of accomplishing the extension of the life of electric discharge and also capable of accomplishing the prevention of an increase in the FVs characteristic in the life test by improving an electric discharge gap and a profile of the electrode face.

In the first embodiment of the present invention, there is provided a gas filled switching electric discharge tube comprising: a cylindrical body made of an insulating material; a first electrode and a second electrode for airtightly closing both ends of the cylindrical body; an electric discharge gap formed between a first electrode face of the first electrode and a second electrode face of the second electrode, an airtightly closed space formed in the cylindrical body being filled with gas; metalized faces formed on both end faces of the cylindrical body, the first and the second electrode being joined to the cylindrical body on both end faces of the cylindrical body; first trigger wires formed on an inner wall face of the cylindrical body, connected with the metalized faces; and second trigger wires formed on the inner wall face of the cylindrical body, not connected with the metalized faces, wherein the number of the second trigger wires is larger than the number of the first trigger wires, an interval of the electric discharge gap is made to be larger than a distance from the second trigger wires to the first or the second electrode face, and a plurality of recess portions are formed on the first electrode face of the first electrode or the second electrode face of the second electrode.

In the second embodiment of the present invention, there is provided a gas filled switching electric discharge tube comprising: a cylindrical body made of insulating material; a first electrode and a second electrode for airtightly closing both ends of the cylindrical body; and an electric discharge gap formed between a first electrode face of the first electrode and a second electrode face of the second electrode, an airtightly closed space formed in the cylindrical body being filled with gas, wherein an interval of the electric discharge gap is made to be larger than a distance from the second trigger wires to the first or the second electrode face, and a plurality of recess portions are formed on the first electrode face of the first electrode or the second electrode face of the second electrode.

In the third embodiment of the present invention, there is provided a filled switching electric discharge tube comprising: a cylindrical body made of insulating material; a first electrode and a second electrode for airtightly closing both ends of the cylindrical body; an electric discharge gap formed between a first electrode face of the first electrode and a second electrode face of the second electrode, an airtightly closed space formed in the cylindrical body being filled with gas; metalized faces formed on both faces of the cylindrical body, the first and the second electrode being joined to the cylindrical body on both the end faces of the cylindrical body; first trigger wires formed on an inner wall face of the cylindrical body, connected with the metalized face; and second trigger wires formed on the inner wall face of the cylindrical body, not connected with the metalized face, wherein the number of the second trigger wires is larger than the number of the first trigger wires, and a plurality of recess portions are formed on the first electrode face of the first electrode or the second electrode face of the second electrode.

In the fourth embodiment of the present invention, there is provided a gas filled switching electric discharge tube comprising: a cylindrical body made of insulating material; a first electrode and a second electrode for airtightly closing both ends of the cylindrical body; an electric discharge gap formed between a first electrode face of the first electrode and a second electrode face of the second electrode, an airtightly closed space formed in the cylindrical body being filled with gas; metalized faces formed on both end faces of the cylindrical body, the first and the second electrode being joined to the cylindrical body on both the end faces of the cylindrical body; first trigger wires formed on an inner wall face of the cylindrical body, connected with the metalized faces; and second trigger wires formed on the inner wall face of the cylindrical body, not connected with the metalized faces, wherein the number of the second trigger wires is larger than the number of the first trigger wires, and an interval of the electric discharge gap is made to be larger than a distance from the second trigger wires to the first or the second electrode face.

The cylindrical body is a cylinder, the first and the second electrode face are substantially circular and formed around the central axis of the cylindrical body, the first and the second electrode face are arranged being symmetrically opposed to each other, the first trigger wires extend from the metalized faces in the axial direction on the inner wall face of the cylindrical body, however, the first trigger wires do not reach a central portion of the cylindrical body, and the second trigger wires extend in the central portion of the cylindrical body in the axial direction.

In this case, the first trigger wire extending from one metalized face on the inner wall face in the axial direction and the first trigger wire extending from the other metalized face on the inner wall face in the axial direction are arranged being formed into a pair at an interval of 180°.

In this case, the pair of the first trigger wires are respectively composed of a plurality of trigger wires arranged close and parallel to each other, and the pair of the first trigger wires are respectively composed of 2 or 3 trigger wires arranged close and parallel to each other.

The length of the first trigger wire in the axial direction is not more than ⅓ of the length of the cylindrical body in the axial direction.

A plurality of the second trigger wires are arranged at substantially regular intervals between a pair of the first trigger wires which are arranged at an interval of 180°, and the length of the second trigger wire in the axial direction is not less than ½ of the length of the cylindrical body in the axial direction.

The cylindrical body is a cylinder, the first and the second electrode face are substantially circular and formed around the central axis of the cylindrical body, the first and the second electrode face are arranged being symmetrically opposed to each other and the first trigger wires extend from the metalized face in the axial direction on the inner wall face of the cylindrical body. However, the first trigger wires do not reach a central portion of the cylindrical body, the second trigger wires extend in the central portion of the cylindrical body in the axial direction, and a distance from the second trigger wire to the first or the second electrode face is the same as a distance from an outer circumference of the electrode face to an inner wall of the cylindrical body in the radial direction. An interval of the electric discharge gap is the same as a distance between an end portion of the first electrode face and an end portion of the second electrode face.

A plurality of recess portions provided on the first or the second electrode face are respectively a hemispherical recess portion. In this case, the plurality of recess portions are uniformly arranged at regular pitches of 0.1–1.0 mm. The first and the second electrode face are arranged being symmetrically opposed to each other, central portions of the electrode faces are hollowed with respect to the peripheral portion, and the plurality of recess portions are formed in the hollow portion.

The cylindrical body is made of ceramic, and the first and the second electrode are made of iron-nickel alloy such as 42-alloy or iron-nickel-cobalt alloy such as covar. The first and the second electrode are joined to the cylindrical body by means of soldering.

BRIEF DESCRIPTION OF THE DRAWINGS

FIG. 1(*b*) is a developed view of a cylindrical body made of ceramic of a gas filled switching electric discharge tube of Embodiment 1 of the present invention;

FIG. 3(*b*) is a developed view of a cylindrical body, made of ceramic, of a gas filled switching electric discharge tube of Embodiment 2 of the present invention;

FIG. 5(*b*) is a developed view of a cylindrical body, made of ceramic, of a gas filled switching electric discharge tube of Embodiment 3 of the present invention;

FIG. 7(*b*) is a developed view of a cylindrical body, made of ceramic, of a gas filled switching electric discharge tube of Embodiment 4 of the present invention;

FIG. 9(*b*) is a developed view of a cylindrical body, made of ceramic, of a gas filled switching electric discharge tube of a comparative example;

DETAILED DESCRIPTION OF THE PREFERRED EMBODIMENTS

Referring to the attached drawings, Embodiments 1 to 4 of the present invention and a Comparative Example will be explained below in detail. In this connection, the following three requirements are appropriately combined with each other in the present invention. The relation of the embodiments to the requirements are shown in Table 1.

(a) Requirement relating to the arrangement of carbon trigger wires (b) Requirement relating to the size of an electric discharge gap (c) Requirement for forming recess portions on an electrode face

TABLE 1

| | Embodiment 1 | Embodiment 2 | Embodiment 3 | Embodiment 4 | Comparative Example |
|---|---|---|---|---|---|
| Trigger wire | ○ | X | ○ | ○ | X |
| Discharge Gap | ○ | ○ | X | ○ | X |
| Recess of Electrode | ○ | ○ | ○ | X | ○ |

Embodiment 1

Figure 1B:
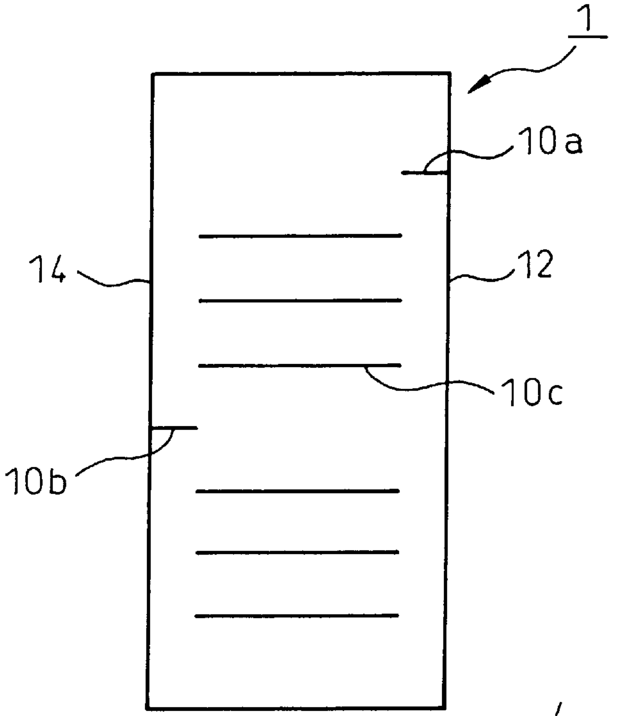
FIG. 1(*a*) is a sectional view of a gas filled switching electric discharge tube of Embodiment 1 of the present invention.
Figure 1A:
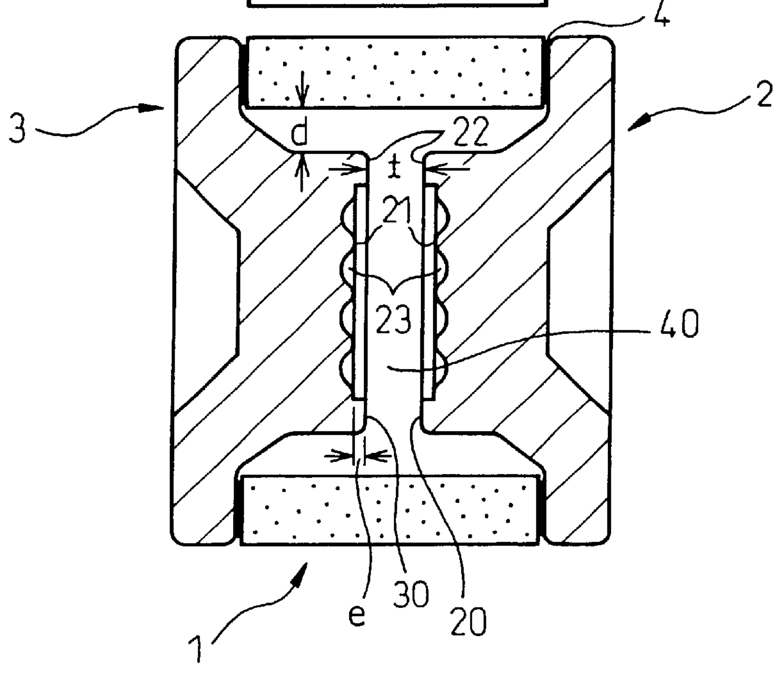
Figure 2:
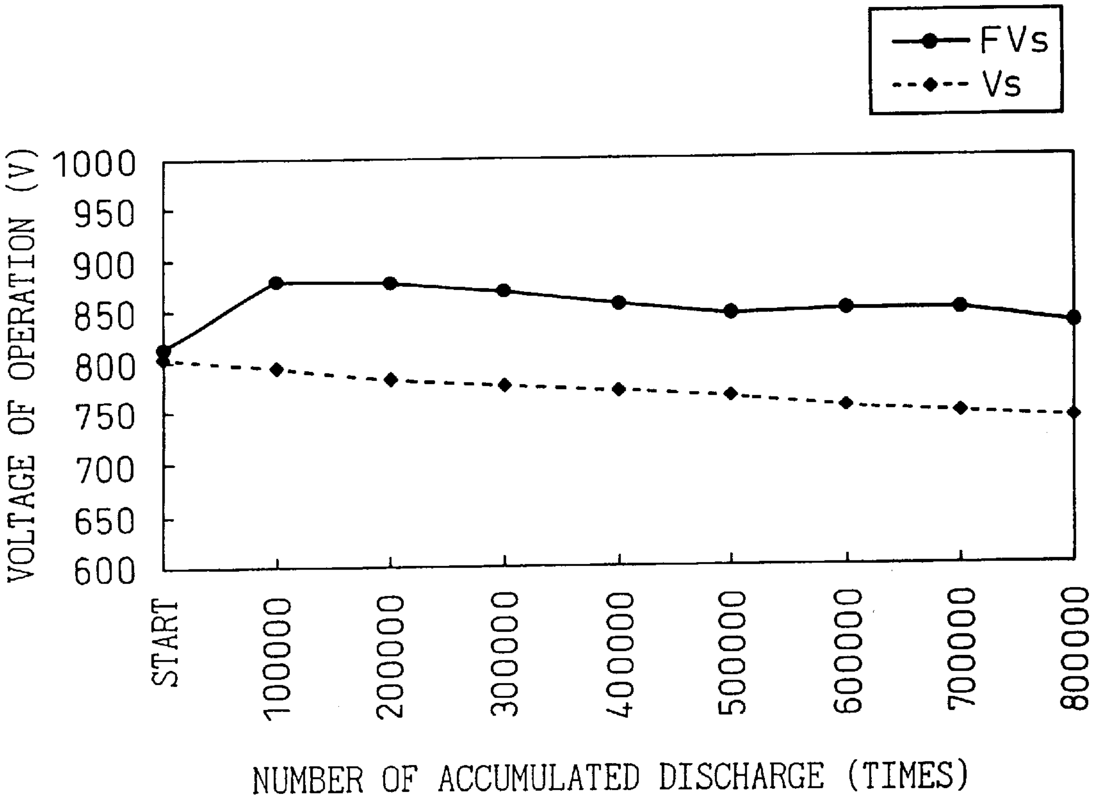
FIG. 2 is a graph showing an effect of the gas filled switching electric discharge tube of Embodiment 1 of the present invention.

FIG. 1(*a*) is a sectional view of a gas filled switching electric discharge tube of Embodiment 1 of the present invention, and FIG. 1(*b*) is a developed view of a cylindrical body, made of ceramic, used in Embodiment 1. FIG. 2 is a graph showing an effect of the gas filled switching electric discharge tube of Embodiment 1 of the present invention.

The gas filled switching electric discharge tube of Embodiment 1 of the present invention includes: a cylindrical body made of an insulating material such as ceramic; and a first electrode 2 and a second electrode 3 for airtightly closing both end portions of the cylindrical body 1. The cylindrical body 1 is joined to the first electrode 2 and the second electrode 3 by the solder 4.

Both end faces of the cylindrical body 1 made of ceramic are formed into the metalized faces 12, 14. As can be seen in FIG. 1(*b*), in which an inner wall face of the cylindrical body 1 made of ceramic is developed, the carbon trigger wires 10*a*, 10*b* on the sides of the metalized faces 12, 14 are arranged at an interval of 180° and extended from the metalized faces 12, 14 on the inner wall face of the cylindrical body 10, made of ceramic, in the axial direction, however, the lengths of the carbon trigger wires 10*a*, 10*b* are small.

On the other hand, the carbon trigger wires 10*c* extend in the axial direction at the center on the inner wall face of the cylindrical body 1 made of ceramic. In this structure, three carbon trigger wires 10*c* are arranged at regular intervals in every space between the trigger wires 10*a*and 10*b* which are respectively provided on the sides of the metalized faces 12, 14, that is, six carbon trigger wires 10*c* are arranged in total. The trigger wires 10*a*, 10*b*, 10*c* are arranged at regular intervals of about 45° in the circumferential direction. These trigger wires 10*c* arranged at the center of the inner wall do not come into contact with the metalized faces 12, 14. These trigger wires 10*c* arranged at the center of the inner wall are relatively longer than the carbon trigger wires 10*a*, 10*b* on the sides of the metalized faces 12, 14.

Figure 13:
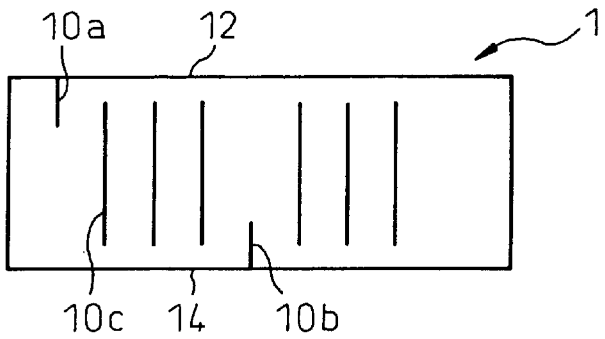
Fig.13 PRIOR ART
FIGS. 13 and 14 are developed views of a cylindrical body, made of ceramic, the number of the trigger wires on the metalized face side of which is reduced.
Figure 14:
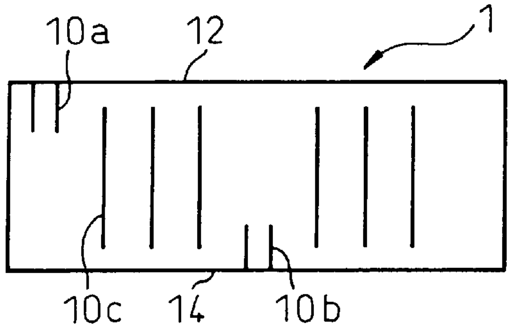
Fig.14 PRIOR ART

In this connection, the arrangements of the carbon trigger wires 10*a*, 10*b*, 10*c* of Embodiment 1 is the same as those shown in FIG. 13. In this case, as shown in FIG. 14, a plurality of carbon trigger wires (two carbon trigger wires) on each side of the metalized faces 12, 14 may be arranged close to each other.

The electrodes 2, 3 are made of iron-nickel alloy such as 42 alloy or iron-nickel-cobalt-alloy such as covar. These electrodes 2, 3 are symmetrical to each other, and the electrode faces 20, 30 are formed to be substantially circular around the central axis of the cylindrical body 1 made of ceramic. These electrode faces 20, 30 are arranged to be symmetrically opposed to each other. Between these electrode faces 20, 30, the electric discharge gap 40 is formed. As is widely known, the inside of the cylindrical body 1 including the electric discharge gap 40 is filled with an inert gas such as argon gas. When a predetermined voltage is impressed between the electrodes 2, 3, an electric discharge occurs between the electrode faces 20, 30.

In this Embodiment 1, the interval t of the electric discharge gap 40, which is measured at the end portions of the electrode faces 20, 30, is larger than the distance d which is a distance from the carbon trigger wire 10*c* at the central portion to the electrode face 20, 30, that is, a distance in the radial direction from the outer circumference of the electrode face 20, 30 to the inner wall of the cylindrical body made of ceramic.

In this Embodiment 1, a central portion of each electrode face 20, 30, which occupies the most of the area of the electrode, is uniformly hollowed to the depth e with respect to the peripheral portion 22 of the electrode. In this hollow portion 21, a plurality of hemispherical recess portions 23 are formed. The plurality of hemispherical recess portions 23 are arranged at regular pitches of 0.8 mm.

The electrode faces 20, 30 having the plurality of hemispherical recess portions 23 are coated with an electric discharge activating coating agent. When a quantity of the electric discharge activating coating agent to be coated is appropriately adjusted, it is possible to extend the life of electric discharge.

Table 2 shows a result of the dark place electric discharge life test of the electric discharge tube of Embodiment 1. FIG. 2 is a graph showing the result of the test. The abscissa represents the accumulated number of times of electric discharge (times), and the ordinate represents the operation voltage (V). As described before, FVs is an electric discharge starting voltage at the first time, and Vs is an average of the electric discharge starting voltage at the second time and after. In this test, it was possible to test 800,000 times.

TABLE 2

| | Results of Embodiment 1 | | | | | | | | |
|---|---|---|---|---|---|---|---|---|---|
| | start | 100000 | 200000 | 300000 | 400000 | 500000 | 600000 | 700000 | 800000 |
| FVs | 812 | 878 | 876 | 868 | 854 | 844 | 848 | 848 | 836 |
| Vs | 802 | 794 | 782 | 776 | 770 | 764 | 754 | 748 | 742 |

As can be seen on Table 1, Embodiment 1 is provided with all three requirements described as follows.

(a) Requirement relating to the arrangement of carbon trigger wires (b) Requirement relating to the size of an electric discharge gap (c) Requirement for forming recess portions on an electrode face Therefore, as shown in the results of the tests, even when the number of times of electric discharge was increased, Vs changed stably. Therefore, the life of electric discharge extended, and the FVs characteristic was stable. Therefore, it was possible to obtain excellent results.

Embodiment 2

Figure 3B:
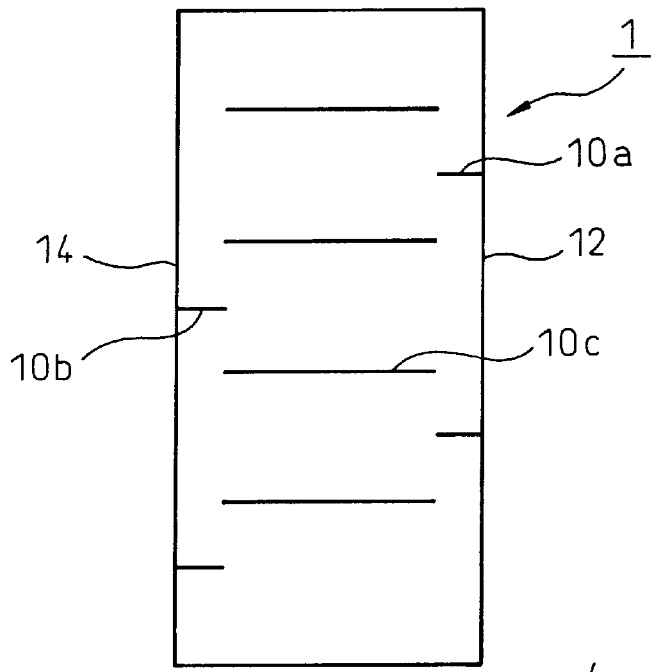
FIG. 3(*a*) is a sectional view of a gas filled switching electric discharge tube of Embodiment 2 of the present invention.
Figure 3A:
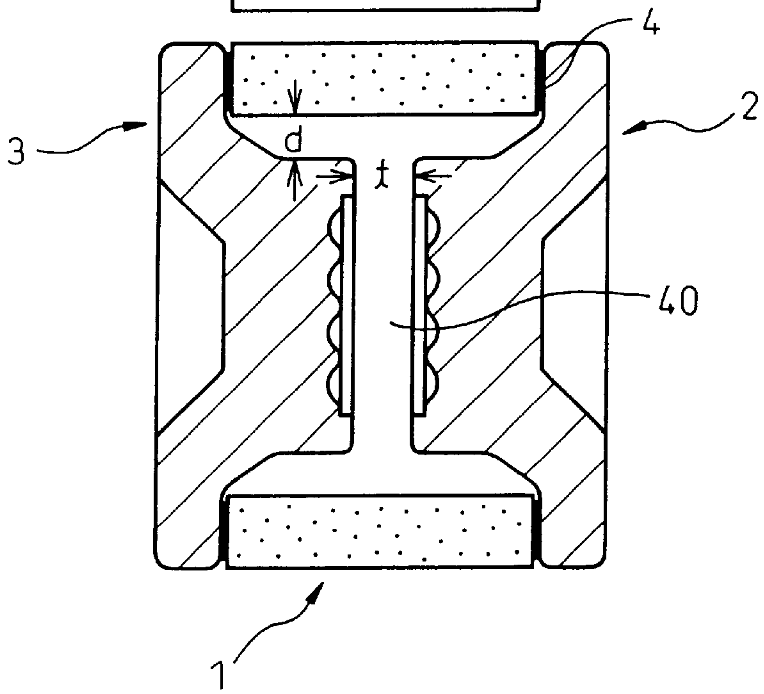
Figure 4:
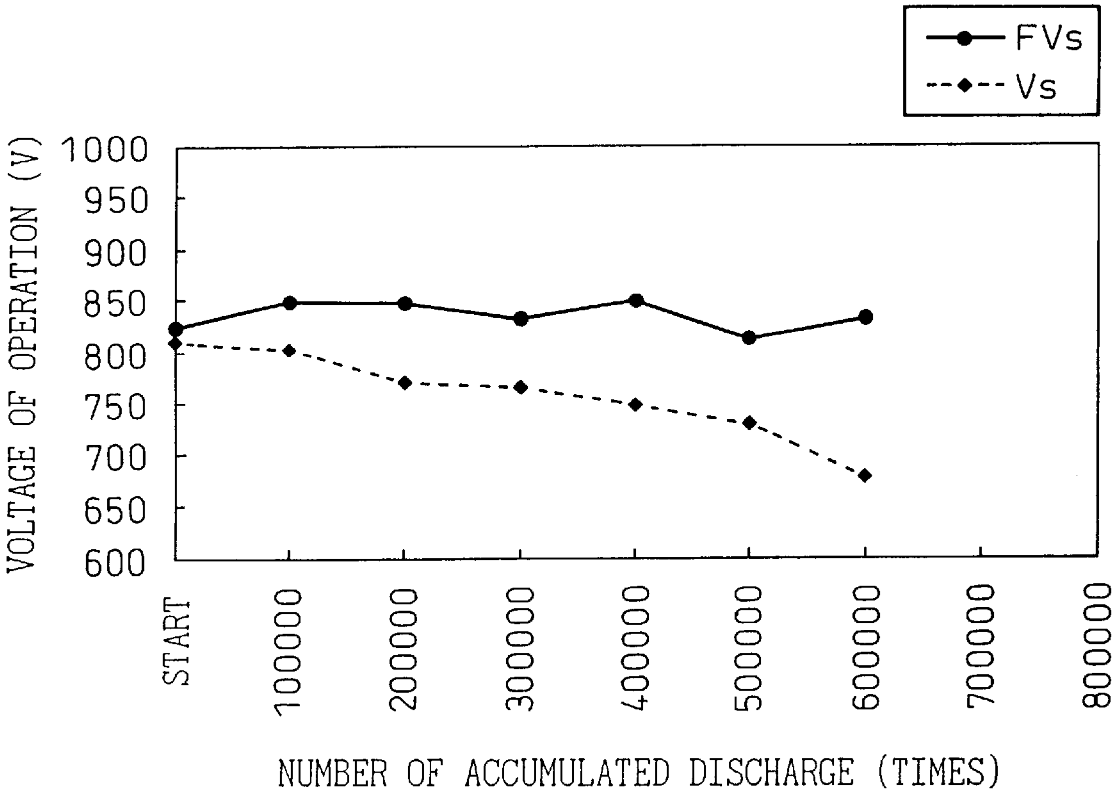
FIG. 4 is a graph showing an effect of the gas filled switching electric discharge tube of Embodiment 2 of the present invention.

FIG. 3(*a*) is a sectional view of a gas filled switching electric discharge tube of Embodiment 2 of the present invention, FIG. 3(*b*) is a developed view of a cylindrical body made of ceramic used in Embodiment 2, and FIG. 4 is a graph showing an effect of the gas filled switching electric discharge tube of Embodiment 2 of the present invention.

Concerning the following two requirements, the gas filled switching electric discharge tube of Embodiment 2 of the present invention is the same as that of Embodiment 1.

(b) Requirement relating to the size of an electric discharge gap (c) Requirement for forming recess portions on an electrode face Therefore, only the arrangement structure of the carbon trigger wires of Embodiment 2, which is different from that of Embodiment 1, will be explained below.

Figure 11:
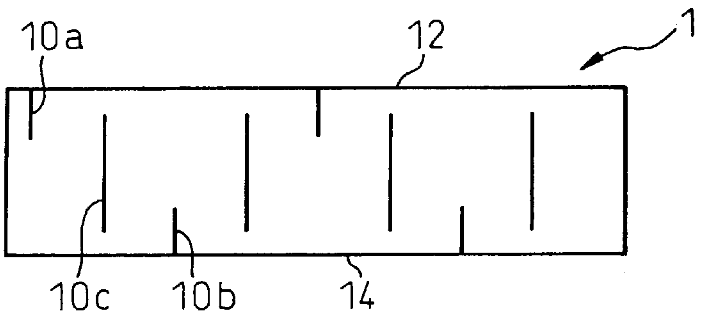
Fig.11 PRIOR ART
FIGS. 11 and 12 are developed views of a cylindrical body, made of ceramic, the number of the trigger wires on the metalized face side of which is large.
Figure 12:
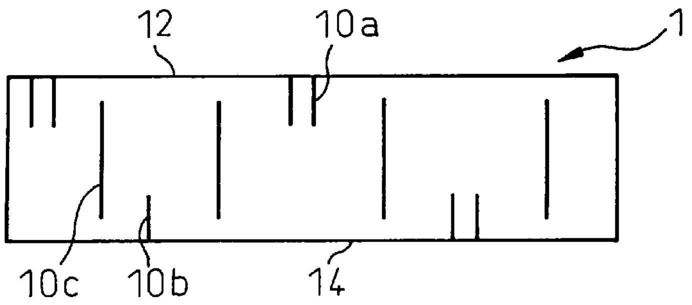
Fig.12 PRIOR ART

In the same manner as that of Embodiment 1, both end faces of the cylindrical body 1, made of ceramic, are formed into the metalized faces 12, 14. The metalized faces 12, 14 are shown in FIG. 3(*b*) in which the developed inner wall face of the cylindrical body 1 made of ceramic is shown. The arrangement structure of this embodiment is the same as that shown in FIG. 11. That is, the carbon trigger wires 10*a*, 10*b* are arranged as follows. The carbon trigger wires 10*a*, 10*b* on the sides of the metalized faces 12, 14 are arranged at intervals of 90° one by one alternately on one metalized face 12 and the other metalized face 14. These carbon trigger wires 10*a*, 10*b* extend from the metalized faces 12, 14 in the axial direction on the inner wall face of the cylindrical body 10 made of ceramic. On the other hand, the carbon trigger wires 10*c*, which extend in the axial direction in the central portion on the inner wall face of the cylindrical body 10 made of ceramic, are arranged between the carbon trigger wires 10*a*, 10*b* on the sides of the metalized faces 12, 14 at intervals of 90° one by one, that is, four carbon trigger wires 10*c* are arranged in total. The carbon trigger wires 10*a*, 10*b*, 10*c* are arranged in the circumferential direction at intervals of about 45°. These carbon trigger wires 10*c*, which are located in the central portion, do not come into contact with the metalized faces 12, 14. These carbon trigger wires 10*c* are relatively longer than the carbon trigger wires 10*a*, 10*b* on the side of the metalized faces 12, 14.

Table 3 shows a result of the dark place electric discharge life test of the electric discharge tube of Embodiment 2. FIG. 4 is a graph showing the result of the test. In this test of Embodiment 2, it was possible to test 600,000 times.

TABLE 3

| | Results of Embodiment 2 | | | | | | |
|---|---|---|---|---|---|---|---|
| | start | 100000 | 200000 | 300000 | 400000 | 500000 | 600000 |
| FVs | 824 | 848 | 846 | 832 | 848 | 812 | 832 |
| Vs | 810 | 802 | 776 | 764 | 748 | 728 | 678 |

As can be seen on Table 1, Embodiment 2 does not satisfy (a) "Requirement relating to the arrangement of carbon trigger wires" but satisfies (b) "Requirement relating to the size of an electric discharge gap" and (c) "Requirement for forming recess portions on an electrode face. Therefore, as can be seen in the test results, compared with the comparative example described later, even if the number of times of electric discharge is increased, Vs changes stably, and at the same time the life of electric discharge is extended, and further FVs characteristic is stabilized. In this way, the results are excellent. However, Embodiment 2 is inferior to Embodiment 1 in the life characteristic when comparison is made between Embodiments 1 and 2.

Embodiment 3

Figure 5B:
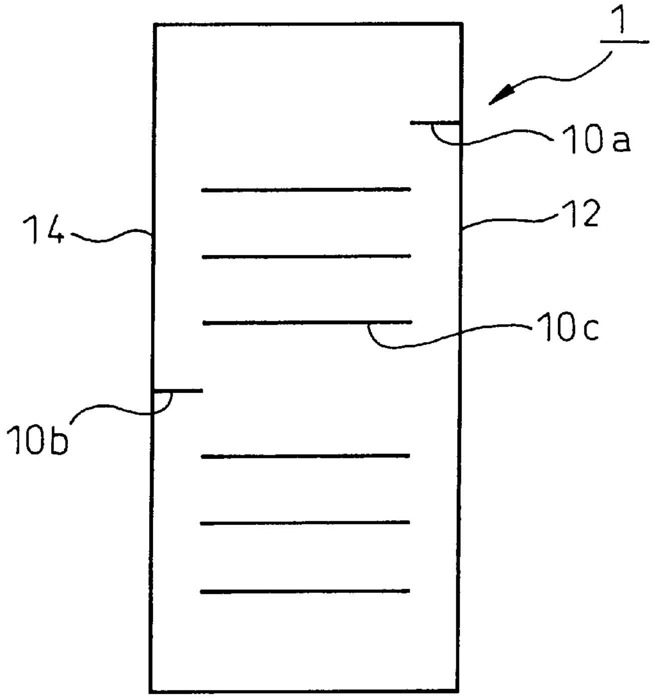
FIG. 5(*a*) is a sectional view of a gas filled switching electric discharge tube of Embodiment 3 of the present invention.
Figure 5A:
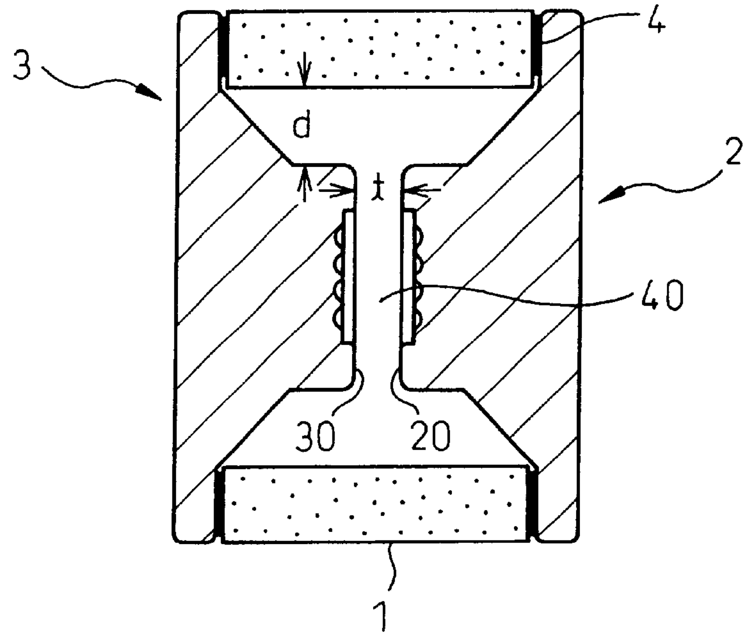
Figure 6:
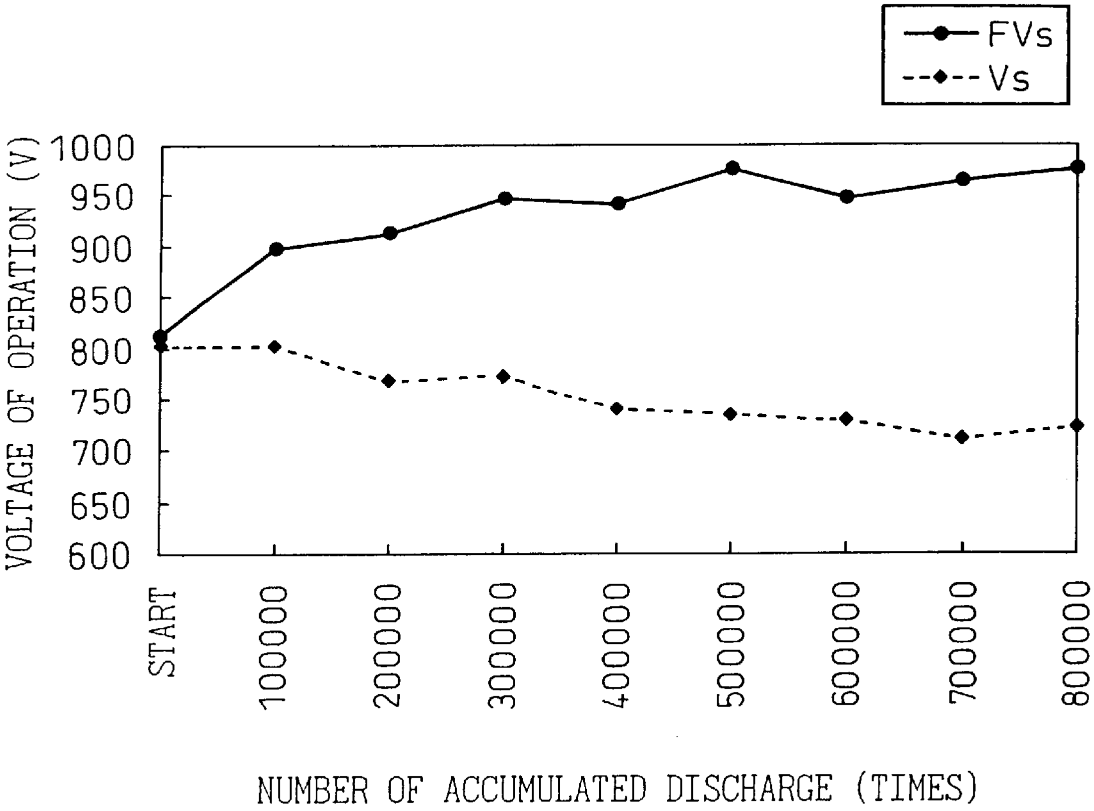
FIG. 6 is a graph showing an effect of the gas filled switching electric discharge tube of Embodiment 3 of the present invention.

FIG. 5(*a*) is a sectional view of a gas filled switching electric discharge tube of Embodiment 3 of the present invention, FIG. 5(*b*) is a developed view of a cylindrical body made of ceramic used in Embodiment 3, and FIG. 6 is a graph showing an effect of the gas filled switching electric discharge tube of Embodiment 3 of the present invention.

In the gas filled switching electric discharge tube of Embodiment 3 of the present invention, as shown on Table 1, Embodiment 3 does not satisfy (b) "Requirement relating to the size of an electric discharge gap" but satisfies (a) "Requirement relating to the arrangement of carbon trigger wires" and (c) "Requirement for forming recess portions on an electrode face". Accordingly, different points of this embodiment from the gas filled switching electric discharge tube of Embodiment 1 will be explained.

The electrodes 2, 3 are symmetrical to each other, and the electrode faces 20, 30 are formed to be substantially circular around the central axis of the cylindrical body 1 made of ceramic. These electrode faces 20, 30 are arranged symmetrically opposed to each other. Between these electrode faces 20, 30, the electric discharge gap 40 is formed. As is widely known, the inside of the cylindrical body 1 including the electric discharge gap 40 is filled with inert gas such as argon gas. The above points are the same as those of Embodiment 1.

However, in Embodiment 3, the interval t of the electric discharge gap 40, which is measured at the end portions of the electrode faces 20, 30, is smaller than the distance d which is a distance from the carbon trigger wire 10*c* at the central portion to the electrode face 20, 30, that is, a distance in the radial direction from the outer circumference of the electrode face 20, 30 to the inner wall of the cylindrical body made of ceramic.

In this Embodiment 3, a central portion of each electrode face 20, 30, which occupies the most of the area of the electrode, is uniformly hollowed to the depth e with respect to the peripheral portion 22 of the electrode. In this hollow portion 21, a plurality of hemispherical recess portions 23 are formed in the same manner as that of Embodiment 1. The plurality of hemispherical recess portions 23 are uniformly arranged at regular pitches of 0.4 mm. Compared with Embodiment 1, the pitch of Embodiment 3 is smaller than that of Embodiment 1. Accordingly, the depth of each hemispherical recess portion 23 of Embodiment 3 is smaller than that of Embodiment 1.

In the same manner as that of Embodiment 1, the electrode faces 20, 30 having the plurality of recess portions 23 are coated with an electric discharge activating coating agent.

Table 4 shows a result of the dark place electric discharge life test of the electric discharge tube of Embodiment 3. FIG. 6 is a graph showing the result of the test. In this test of Embodiment 3, it was possible to test 800,000 times.

TABLE 4

| | Results of Embodiment 3 | | | | | | | | |
|---|---|---|---|---|---|---|---|---|---|
| | start | 100000 | 200000 | 300000 | 400000 | 500000 | 600000 | 700000 | 800000 |
| FVs | 812 | 898 | 912 | 946 | 942 | 976 | 946 | 964 | 976 |
| Vs | 802 | 802 | 768 | 772 | 740 | 734 | 728 | 712 | 724 |

In the gas filled switching electric discharge tube of Embodiment 3 of the present invention, as shown on Table 1, Embodiment 3 does not satisfy (b) "Requirement relating to the size of an electric discharge gap" but satisfies (a) "Requirement relating to the arrangement of carbon trigger wires" and (c) "Requirement for forming recess portions on an electrode face". Therefore, as can be seen in the test results, compared with the comparative example described later, even if the number of times of electric discharge is increased, Vs changes stably, and at the same time the life of electric discharge is extended and, further, the FVs characteristic is stabilized. In this way, the results are excellent. However, Embodiment 3 is inferior to Embodiment 1 in the electric discharge voltage characteristic when comparison is made between Embodiments 1 and 3.

Embodiment 4

Figure 7B:
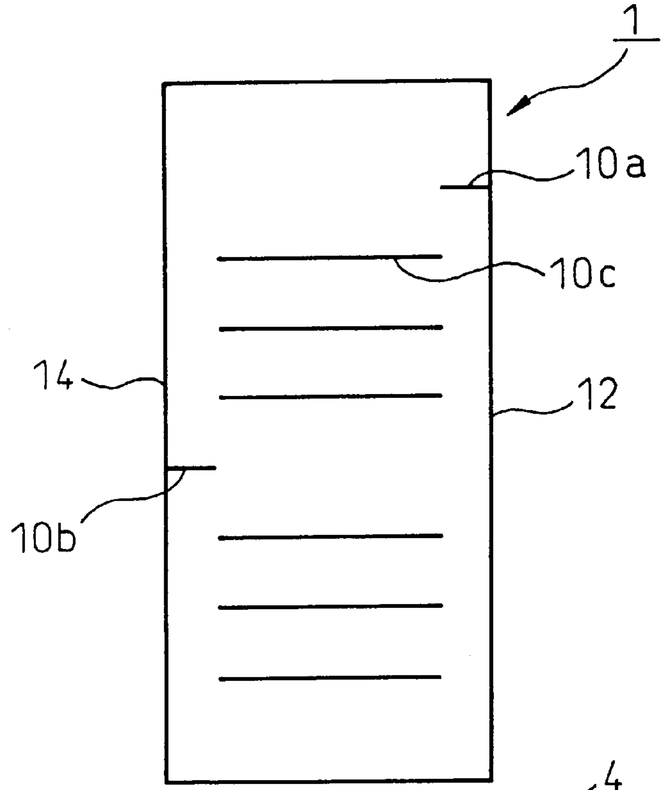
FIG. 7(*a*) is a sectional view of a gas filled switching electric discharge tube of Embodiment 4 of the present invention.
Figure 7A:
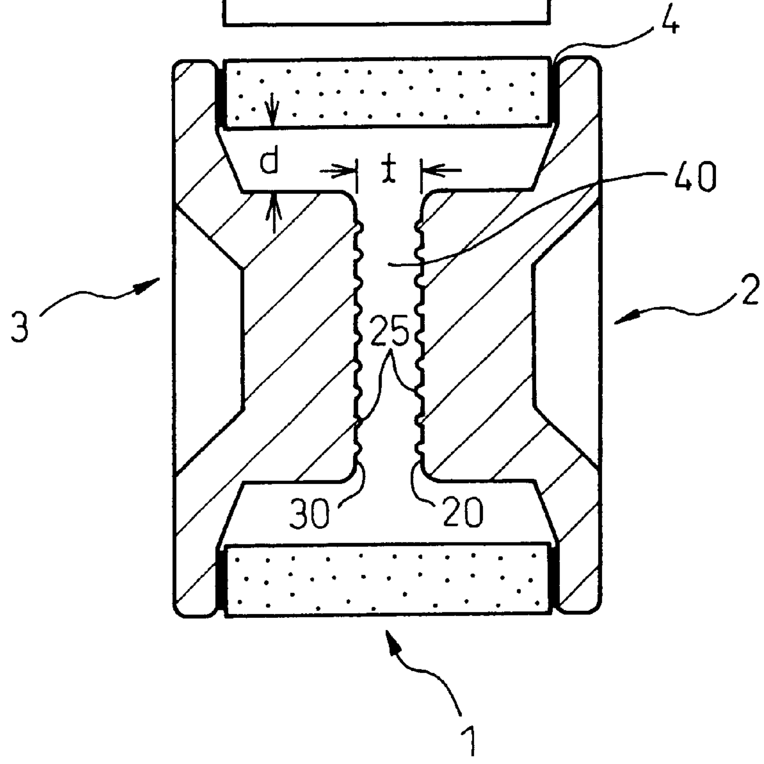
Figure 8:
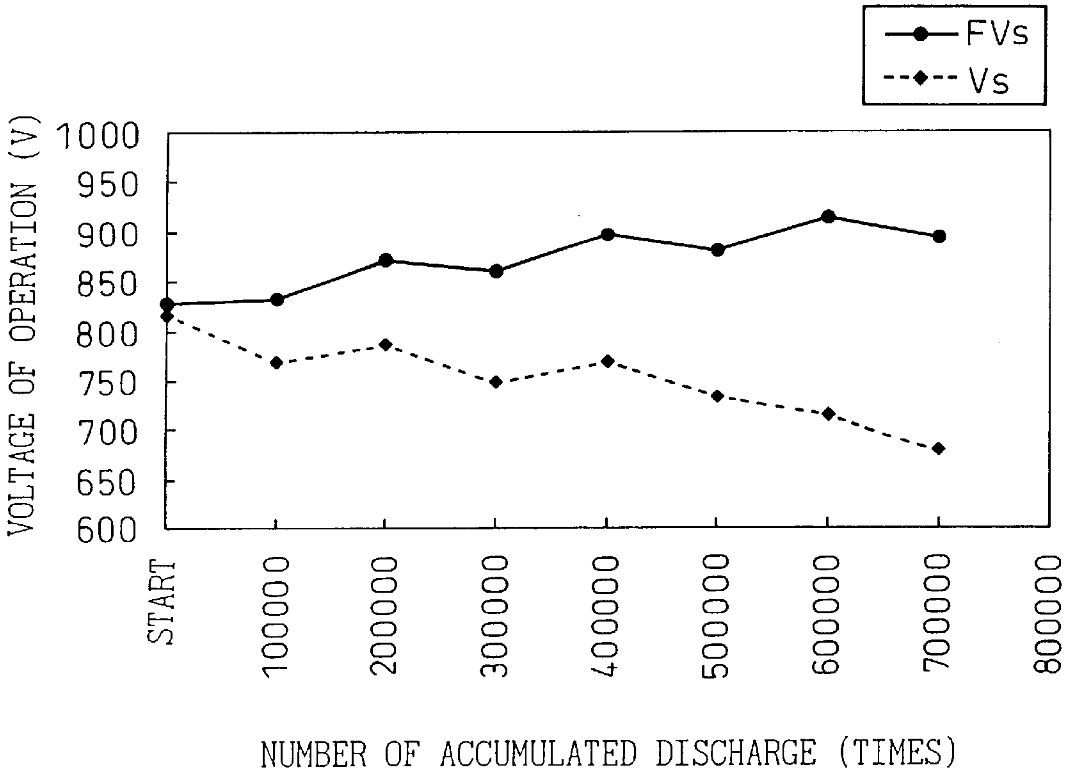
FIG. 8 is a graph showing an effect of the gas filled switching electric discharge tube of Embodiment 4 of the present invention.

FIG. 7(*a*) is a sectional view of a gas filled switching electric discharge tube of Embodiment 4 of the present invention, FIG. 7(*b*) is a developed view of a cylindrical body, made of ceramic, used in Embodiment 4, and FIG. 8 is a graph showing an effect of the gas filled switching electric discharge tube of Embodiment 4 of the present invention.

In the gas filled switching electric discharge tube of Embodiment 4 of the present invention, as shown on Table 1, Embodiment 4 does not satisfy (c) "Requirement for forming recess portions on an electrode face" but satisfies (a) "Requirement relating to the arrangement of carbon trigger wires" and (b) "Requirement relating to the size of an electric discharge gap". Accordingly, only different points of Embodiment 4 from the gas filled switching electric discharge tube of Embodiment 1 will be explained.

These electrodes 2, 3 are symmetrical to each other, and the electrode faces 20, 30 are formed to be substantially circular around the central axis of the cylindrical body 1 made of ceramic. These electrode faces 20, 30 are arranged symmetrically opposed to each other. Between these electrode faces 20, 30, the electric discharge gap 40 is formed. As is widely known, the inside of the cylindrical body 1 including the electric discharge gap 40 is filled with an inert gas such as argon gas. The above points are the same as those of Embodiment 1.

In this Embodiment 4, the interval t of the electric discharge gap 40, which is measured at the end portions of the electrode faces 20, 30, is larger than the distance d which is a distance in the radial direction from the outer circumference of the electrode face 20, 30 to the inner wall of the cylindrical body made of ceramic. These points of this embodiment are the same as those of Embodiment 1.

However, in Embodiment 4, a portion corresponding to the hollow portion 21, which is provided in Embodiments 1 to 3, is not provided. However, in this Embodiment 4, on the flat electrode faces 20, 30, there are provided grid-shaped protrusions 25.

In the same manner as that of Embodiments 1 to 3, the electrode faces 20, 30 having the grid-shaped protrusions 25 are coated with an electric discharge activating coating agent.

Table 5 shows a result of the dark place electric discharge life test of the electric discharge tube of Embodiment 4. FIG. 8 is a graph showing the result of the test. In this test of Embodiment 4, it was possible to test 700,000 times.

TABLE 5

| | Results of Embodiment 4 | | | | | | | |
|---|---|---|---|---|---|---|---|---|
| | start | 100000 | 200000 | 300000 | 400000 | 500000 | 600000 | 700000 |
| FVs | 828 | 832 | 872 | 860 | 896 | 878 | 912 | 892 |
| Vs | 816 | 768 | 786 | 748 | 768 | 732 | 714 | 678 |

In the gas filled switching electric discharge tube of Embodiment 4 of the present invention, as shown on Table 1, Embodiment 4 does not satisfy (c) "Requirement for forming recess portions on an electrode face", but satisfies (a) "Requirement relating to the arrangement of carbon trigger wires" and (b) "Requirement relating to the size of an electric discharge gap". Therefore, as can be seen in the test results, compared with the comparative example described later, even if the number of times of electric discharge is increased, Vs changes stably, and at the same time the life of electric discharge is extended, and further FVs characteristic is stabilized. In this way, the results are excellent. However, in Embodiment 4, both FVs and Vs are not stable, that is, Embodiment 4 is inferior to Embodiment 1 in the stability of the electric discharge voltage characteristic when comparison is made between Embodiments 1 and 4.

COMPARATIVE EXAMPLE

Figure 9B:
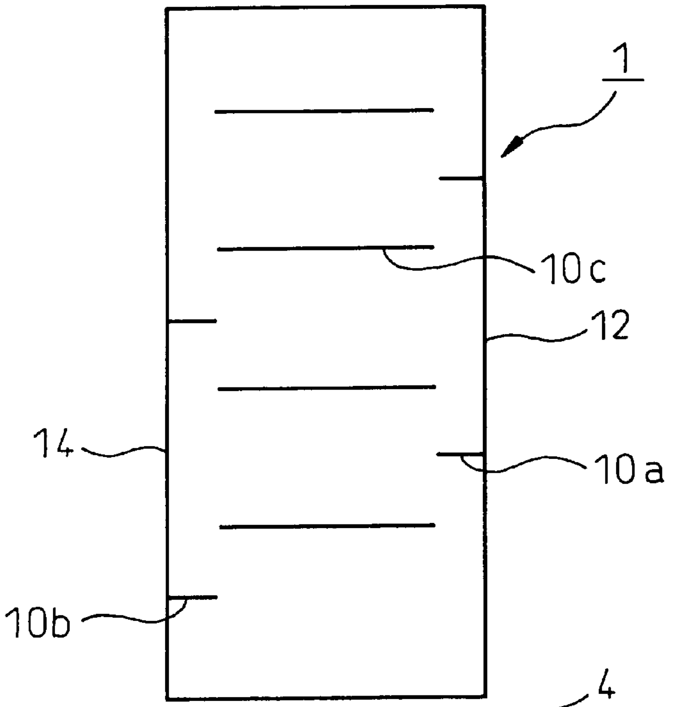
FIG. 9(*a*) is a sectional view of a gas filled switching electric discharge tube of a comparative example.
Figure 9A:
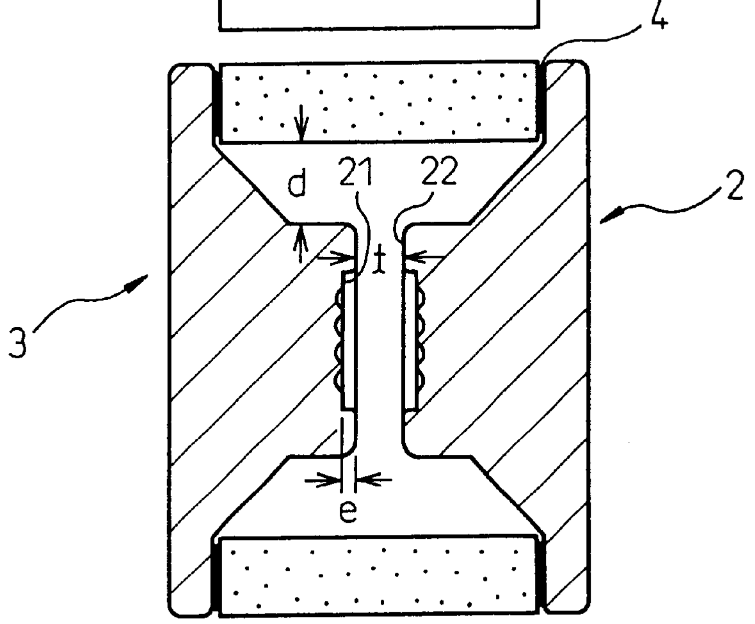
Figure 10:
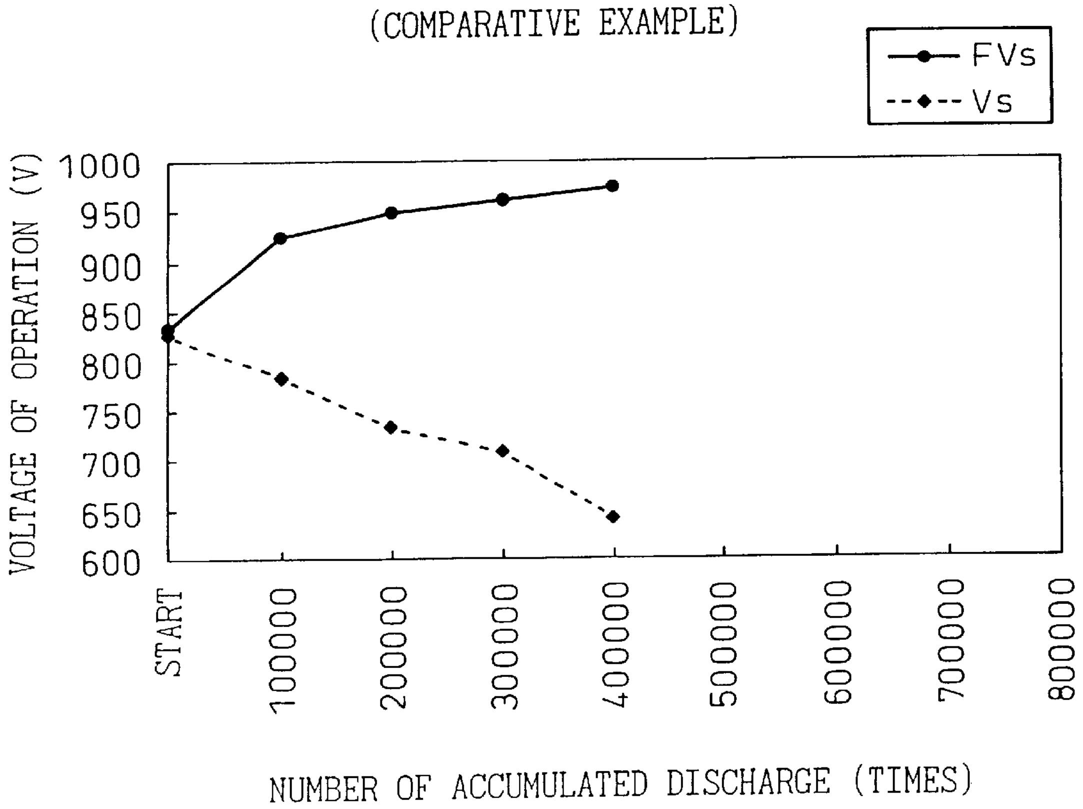
FIG. 10 is a graph showing an effect of the gas filled switching electric discharge tube of the comparative example shown in FIG. 9.

FIG. 9(*a*) is a sectional view of a gas filled switching electric discharge tube Comparative Example, FIG. 9(*b*) is a developed view of a cylindrical body made of ceramic used in this Comparative Example, and FIG. 10 is a graph showing an effect of the gas filled switching electric discharge tube of the Comparative Example.

AS shown on Table 1, the gas filled switching electric discharge tube of this Comparative Example satisfies only (c) "Requirement for forming recess portions on an electrode face", and does not satisfy (a) "Requirement relating to the arrangement of carbon trigger wires" and (b) "Requirement relating to the size of an electric discharge gap".

In this Comparative Example, both end faces of the cylindrical body 1, made of ceramic are formed into the metalized faces 12, 14 and shown in FIG. 9(*b*) which is a developed view of the inner wall face of the cylindrical body 1 made of ceramic. The arrangement structure of the carbon trigger wires shown in FIG. 9(*b*) is the same as that shown in FIG. 11. That is, the carbon trigger wires 10*a*, 10*b* on the sides of the metalized faces 12, 14 are alternately arranged at intervals of 90° one by one on the side of one metalized face 12 and on the side of the other metalized face 14. On the other hand, the carbon trigger wires 10*c* extending in the axial direction at the central portion on the inner wall face of the cylindrical body 10, made of ceramic, are arranged at regular intervals of 90° between the carbon trigger wires 10*a*, 10*b* on the sides of the metalized faces 12, 14, that is, the number of the carbon trigger wires 10*c* is four in total.

In this Comparative Example, the interval t of the electric discharge gap 40, which is measured at the end portions of the electrode faces 20, 30, is smaller than the distance d which is a distance from the carbon trigger wire 10*c* at the central portion to the electrode face 20, 30, that is, a distance in the radial direction from the outer circumference of the electrode face 20, 30 to the inner wall of the cylindrical body made of ceramic.

In this Comparative Example, a central portion of each electrode face 20, 30, which occupies the most of the area of the electrode face, is uniformly hollowed to the depth e with respect to the peripheral portion 22 of the electrode face. In this hollow portion 21, a plurality of hemispherical recess portions 23 are formed in the same manner as that of the above embodiments. The plurality of hemispherical recess portions 23 are arranged at regular pitches of 0.4 mm. When this Comparative Example is compared with Embodiment 1, the pitch in this Comparative Example is smaller than that of Embodiment 1. Accordingly, the depth of each hemispherical recess portion 23 in this Comparative Example is smaller than that of Embodiment 1. In the same manner as that of each embodiment, the electrode faces 20, 30 are coated with an electric discharge activating agent in the same manner as that of each embodiment described before.

Table 6 shows a result of the dark place electric discharge life test of the electric discharge tube of Comparative Example. FIG. 10 is a graph showing the result of the test. In this test, it was possible to test only 400,000 times.

TABLE 6

| | Results of Comparative Example | | | | |
|---|---|---|---|---|---|
| | start | 100000 | 200000 | 300000 | 400000 |
| FVs | 833 | 924 | 948 | 960 | 972 |
| Vs | 828 | 784 | 721 | 664 | 640 |

As can be seen on Table 1, the Comparative Example satisfies only (c) "Requirement for forming recess portions on an electrode face" and does not satisfy (a) "Requirement relating to the arrangement of carbon trigger wires" and (b) "Requirement relating to the size of an electric discharge gap". Therefore, as can be seen in the test results, when the number of times of electric discharge is increased, neither Vs nor FVs changes stably, and the life of electric discharge deteriorates and the electric discharge voltage characteristic is not stabilized.

Since a large number of carbon trigger wires are arranged on the sides of the metalized faces on the end faces of the cylindrical body made of ceramic, by the effect of sputter caused by the electric discharge in the test of the life of electric discharge, the switching electric discharge voltage is lowered after the second discharge. On the other hand, the FVs characteristic is gradually increased in the test.

As explained above, according to the present invention, (a) the carbon trigger wires are arranged as explained in Embodiments 1, 3 and 4 in such a manner that the number of the carbon trigger wires on the sides of the metalized faces is decreased, and on the other hand, the number of the carbon trigger wires on the central side of the cylindrical body made of ceramic is increased.

Therefore, when the electric discharge test is continued, conductive sputtering material scatters from the electrodes due to the electric discharge energy and starts adhering in a belt shape to the central portion of the inner wall of the cylindrical body made of ceramic. When this conductive sputtering material, which has scattered in this way, extends to end portions of the carbon triggers on the sides of the metalized faces provided on both sides, Vs starts deteriorating and also the insulating resistance starts deteriorating in the life test. For the above reasons, it is preferable that the number of the carbon trigger wires on the sides of the metalized faces is reduced to as small as possible. However, when the carbon trigger wires on the sides of the metalized faces are completely abolished, the FVs characteristic is deteriorated, which causes a failure in the electric discharge because FVs increases in the test. In view of the above circumstances, the present invention adopts an arrangement structure by which the highest effect can be provided for extending the life of electric discharge. In this connection, the arrangement structure of the carbon trigger wires is not limited to the one shown in FIG. 13. When a plurality of carbon trigger wires are arranged close to each other on the sides of the metalized faces as shown in FIG. 14, it is possible to provide the same effect.

In addition, according to the present invention, (b) the interval of the electric discharge gap and the distance from the electrode face to the carbon trigger wire are restricted. That is, the interval of the electric discharge gap is extended with respect to the distance (interval) from the electrode face to the carbon trigger wire.

When the electric discharge test is continued, there is caused a phenomenon in which the coating agent, which is coated on the electrode face of the electrode, is scattered together with sputter generated by the electric discharge energy. Therefore, in a dark state, in which the filled gas is not excited at all by the effect of photo-electrons, even if electric discharge is going to be stably started in the life test, FVs starts rising because the coating agent is scattered and decreased. Therefore, in some cases, a failure of electric discharge occurs in which the switching electric discharge is not caused at all. For the above reasons, a relation between the interval of the electric discharge gap and the distance from the electrode face to the carbon trigger wire is restricted so as to provide the following effects.

(1) It is possible to cause a main discharge transition easily by reducing a creeping corona discharge distance, and also it is possible to reduce a period of time until it transits to the main discharge by making the initial electrons, which are generated from the carbon trigger wires, approach an electric discharge gap (between the electric discharge electrode faces) in which the main discharge is caused.

(2) A decline of Vs and deterioration of insulating resistance are suppressed by concentrating the distribution of scattering sputter, which is caused in the process of the life test, at the center of the cylindrical body made of ceramic.

(3) From the viewpoint of the property of the electric discharge tube, it is inevitable that the conductive sputter is scattered by electric discharge energy on the inner wall of the cylindrical body made of ceramic. This inevitable phenomenon is used as it is. When the distribution of sputter, which is scattering on the inner wall of the cylindrical body made of ceramic, is made to concentrate upon the center of the cylindrical body made of ceramic, in a dark state in which the filled gas is not excited at all by the effect of photo-electrons, creeping corona discharge and initial electrons are generated from a belt-shaped sputtered material which has been scattered onto the inner wall of the cylindrical body made of ceramic. Due to the foregoing, it becomes possible to make the FVs characteristic approach Vs after the second electric discharge, and also it becomes possible to generate electric discharge stably.

According to the present invention, when the above requirements (a) and (b) are appropriately combined with each other, it becomes possible to provide a predetermined effect.

It will be understood by those skilled in the art that the foregoing description relates to only some preferred embodiments of the disclosed invention, and that various changes and modifications may be made to the invention without departing the sprit and scope thereof.

What is claimed is:

1. A gas filled switching electric discharge tube comprising:

a cylindrical body made of insulating material;

a first electrode and a second electrode for airtightly closing both ends of the cylindrical body so that an electric discharge gap is formed between a first electrode face of the first electrode and a second electrode face of the second electrode, and an airtightly closed space formed in the cylindrical body is filled with gas;

metalized faces formed on both end faces of the cylindrical body, the first electrode and the second electrode being joined to the cylindrical body on both end faces of the cylindrical body;

first trigger wires formed on an inner wall face of the cylindrical body, connected with the metalized faces;

second trigger wires formed on the inner wall face of the cylindrical body, not connected with the metalized faces;

a number of the second trigger wires being larger than a number of the first trigger wires;

an interval of the electric discharge gap being made to be larger than a distance from the second trigger wires to the first electrode face or the second electrode face; and a plurality of recess portions being formed on the first electrode face of the first electrode or the second electrode face of the second electrode.

2. A gas filled switching electric discharge tube according to claim 1, wherein the cylindrical body is a cylinder, the first electrode and the second electrode face are substantially circular and formed around the central axis of the cylindrical body, the first electrode face and the second electrode face are arranged symmetrically opposed to each other, the first trigger wires extend from the metalized faces in an axial direction on the inner wall face of the cylindrical body but the first trigger wires do not reach a central portion of the cylindrical body, and the second trigger wires extend in the central portion of the cylindrical body in the axial direction.

3. A gas filled switching electric discharge tube according to claim 2, wherein the first trigger wire extending from one metalized face on the inner wall face in the axial direction and the first trigger wire extending from the other metalized face on the inner wall face in the axial direction are arranged and formed into a pair at an interval of 180°.

4. A gas filled switching electric discharge tube according to claim 3, wherein a pair of the first trigger wires are respectively composed of a plurality of trigger wire lines arranged close and parallel to each other.

5. A gas filled switching electric discharge tube according to claim 3, wherein the pair of the first trigger wires are respectively composed of 2 or 3 trigger wire lines arranged close and parallel to each other.

6. A gas filled switching electric discharge tube according to claim 3, wherein a plurality of the second trigger wires are arranged at substantially regular intervals between the pair of the first trigger wires which are arranged at an interval of 180°.

7. A gas filled switching electric discharge tube according to claim 2, wherein a length of the first trigger wire in the axial direction is not more than ⅓ of the length of the cylindrical body in the axial direction.

8. A gas filled switching electric discharge tube according to claim 2, wherein a length of the second trigger wire in the axial direction is not less than ½ of the length of the cylindrical body in the axial direction.

9. A gas filled switching electric discharge tube according to claim 8, wherein the cylindrical body is a cylinder, the first and the second electrode face are substantially circular and formed around the central axis of the cylindrical body, the first and the second electrode face are arranged symmetrically opposed to each other, the first trigger wires extend from the metalized face in the axial direction on the inner wall face of the cylindrical body but the first trigger wires do not reach the central portion of the cylindrical body, the second trigger wires extend in the central portion of the cylindrical body in the axial direction, and a distance from the second trigger wire to the first or the second electrode face is the same as a distance from an outer circumference of the electrode face to an inner wall of the cylindrical body in the radial direction.

10. A gas filled switching electric discharge tube according to claim 9, wherein an interval of the electric discharge gap is the same as a distance between an end portion of the first electrode face and an end portion of the second electrode face.

11. A gas filled switching electric discharge tube according to claim 1, wherein the plurality of recess portions provided on the first or the second electrode face are respectively a hemispherical recess portion.

12. A gas filled switching electric discharge tube according to claim 11, wherein the plurality of recess portions are uniformly arranged at regular pitches of 0.1–1.0 mm.

13. A gas filled switching electric discharge tube according to claim 1, wherein the first and the second electrode face are arranged symmetrically opposed to each other, a central portions of the electrode faces are hollowed with respect to the peripheral portion, and the plurality of recess portions are formed in the hollow portion.

14. A gas filled switching electric discharge tube according to claim 1, wherein the cylindrical body is made of ceramic, and the first and the second electrode are made of iron-nickel alloy such as 42 alloy or iron-nickel-cobalt alloy such as covar.

15. A gas filled switching electric discharge tube according to claim 1, wherein the first and the second electrode are joined to the cylindrical body by means of soldering.

16. A gas filled switching electric discharge tube comprising:

a cylindrical body made of insulating material;

a first electrode and a second electrode for airtightly closing both ends of the cylindrical body so that an electric discharge gap is formed between a first electrode face of the first electrode and a second electrode face of the second electrode, and an airtightly closed space formed in the cylindrical body is filled with gas;

metalized faces formed on both end faces of the cylindrical body, the first electrode and the second electrode being joined to the cylindrical body on both end faces of the cylindrical body;

first trigger wires formed on an inner wall face of the cylindrical body, connected with the metalized faces;

second trigger wires formed on the inner wall face of the cylindrical body, not connected with the metalized faces;

an interval of the electric discharge gap being made to be larger than a distance from the second trigger wires to the first or the second electrode face; and a plurality of recess portions are formed on at least one of the first electrode face of the first electrode and the second electrode face of the second electrode.

17. A gas filled switching electric discharge tube comprising:

a cylindrical body made of insulating material;

a first electrode and a second electrode for airtightly closing both ends of the cylindrical body so that an electric discharge gap is formed between a first electrode face of the first electrode and a second electrode face of the second electrode, and an airtightly closed space formed in the cylindrical body being filled with gas;

metalized faces formed on both end faces of the cylindrical body, the first electrode and the second electrode being joined to the cylindrical body on both end faces of the cylindrical body;

first trigger wires formed on an inner wall face of the cylindrical body, connected with the metalized face;

second trigger wires formed on the inner wall face of the cylindrical body, not connected with the metalized face;

a number of the second trigger wires being larger than a number of the first trigger wires; and a plurality of recess portions being formed on the first electrode face of the first electrode or the second electrode face of the second electrode.

18. A gas filled switching electric discharge tube comprising:

a cylindrical body made of insulating material;

a first electrode and a second electrode for airtightly closing both ends of the cylindrical body so that an electric discharge gap is formed between a first electrode face of the first electrode and a second electrode face of the second electrode, and an airtightly closed space formed in the cylindrical body being filled with gas;

metalized faces formed on both faces of the cylindrical body, the first and the second electrode being joined to the cylindrical body on both the end faces of the cylindrical body;

first trigger wires formed on an inner wall face of the cylindrical body, connected with the metalized faces;

second trigger wires formed on the inner wall face of the cylindrical body, not connected with the metalized faces;

a number of the second trigger wires being larger than a number of the first trigger wires; and an interval of the electric discharge gap being made to be larger than a distance from the second trigger wires to the first or the second electrode face.

* * * * *